(12) United States Patent
Westphal (10) Patent No.: US 7,567,726 B2
(45) Date of Patent: Jul. 28, 2009

(54) METHOD AND ARRANGEMENT FOR SUPPRESSING STRAY LIGHT

(75) Inventor: Peter Westphal, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 715 days.

(21) Appl. No.: 11/266,236

(22) Filed: Nov. 4, 2005

(65) Prior Publication Data

US 2006/0098895 A1 May 11, 2006

(30) Foreign Application Priority Data

Nov. 6, 2004 (DE) .................. 10 2004 053 730

(51) Int. Cl.
*G06K 9/00* (2006.01)
(52) U.S. Cl. ...................... 382/274; 382/321
(58) Field of Classification Search ................ 382/108, 382/128, 133, 134, 274, 275, 312, 321; 250/559.16; 356/603, 604, 610, 612
See application file for complete search history.

(56) References Cited

U.S. PATENT DOCUMENTS 4,259,589 A * 3/1981 DiMatteo et al. ............ 250/558
5,581,352 A * 12/1996 Zeien .......................... 356/376
6,376,818 B1    4/2002 Wilson et al. ............ 250/201.3
7,345,754 B1 *  3/2008 Zhao et al. ................ 356/237.5
2002/0146169 A1* 10/2002 Sukthankar et al. ......... 382/170

FOREIGN PATENT DOCUMENTS

DE   199 30 816 A1   1/2001
DE   103 30 716 A1   2/2005

* cited by examiner

*Primary Examiner*—Andrew W Johns
(74) *Attorney, Agent, or Firm*—Walter Ottesen (57) ABSTRACT

A method images an object (4) by means of a wide field optic onto a position resolving detector (6) for optical radiation with suppression of stray light. In this method, the object (4) is illuminated in at least one object plane (3) with at least two illumination patterns (26, 27) and corresponding images are detected for each of the illumination patterns (26, 27). The illumination patterns (26, 27) each have bright regions (26; 33; 37) and dark regions (27) in the object plane (3). When there is a superposition of the illumination patterns (26, 27) in the optic plane (3), the object (4) is completely covered. A dark image of the object is determined from the detected images. A bright image of the object (4) is generated and the dark image is subtracted from the bright image.

31 Claims, 7 Drawing Sheets

METHOD AND ARRANGEMENT FOR SUPPRESSING STRAY LIGHT

CROSS REFERENCE TO RELATED APPLICATION

This application claims priority of German patent application no. 10 2004 053 730.5, filed Nov. 6, 2004, the entire content of which is incorporated herein by reference.

FIELD OF THE INVENTION

The invention relates to a method for imaging an object by means of a wide field optic onto a position-resolving detector for optical radiation with suppression of stray light as well as to an arrangement for carrying out the method.

BACKGROUND OF THE INVENTION

Biological specimens or materials are often investigated microscopically. Appropriate objects can especially be investigated with wide field optics which image the object or a plane of the object onto a position-resolving detector. The investigation can, for example, take place with conventional microscopy or fluorescence microscopy, especially quantitative fluorescence microscopy. The objects can especially be biochips which were produced with photolithographic techniques or by means of a spotter or the objects can be material surfaces.

There is always the problem of the presence of stray light when using wide field optics for imaging heterogeneously luminescing surfaces or areal objects onto a position-resolving detector, for example, a CCD-camera. The stray light negatively affects the imaging of the object. Stray light is here understood to mean all light which reduces or makes incorrect the contrast of the detected intensity distribution. Stray light arises, for example, because of reflections and scattered light on surfaces, in glasses (for example, because of air pockets), because of inherent fluorescence of the used glasses, on frames or, in fluorescence measurements, because of non-suppressed excitation light. Furthermore, stray light can also come from regions of the object or the specimen lying outside of the focus plane, for example, from the backside of an object carrier. Stray light is especially a problem when the brightness distribution of the specimen is intensely heterogeneous and a high contrast ratio is required for the detection.

For example, in an image of an object, which includes a multiplicity of like fluorescing spheres, a bright surface can be formed from a corresponding plurality of like fluorescing spheres or circles having sharply defined diameters. Apart from diffraction effects, in the ideal case, maximum brightness should be present where the spheres or circles are disposed. In the remaining regions, complete darkness should be present. Actually, however, where it should be dark, a certain residual brightness is present, that is, a non-homogeneous background whose cause lies in the above-mentioned stray light. If this background were distributed homogeneously over the image, it could be viewed as an offset and could be subtracted from all pixel values of the detector in a simple manner. Such an ideal case is, however, hardly to be found in practice and accordingly, this procedure cannot generally be applied.

In radiometric measurements, specifically in biochip applications and in quantitative fluorescence microscopy in general, the useable intensity dynamic, which reflects the ratio of the largest to the smallest detectable value, is greatly limited by the non-homogeneous background because, for an unknown fluorophor distribution, the useful light cannot be distinguished from the stray light. This is especially problematical when no or hardly any reference areas are available on which locally the background can be determined, that is, for example, in high density biochips which are produced photolithographically.

A possibility for avoiding stray light lies in the use of confocal laser scanners. In confocal laser scanners, always only a small area of the specimen of a few $\mu m^2$ is illuminated and only this small surface is viewed with the detection. Stray light is suppressed ab initio if this is carried out consequently with the aid of a well-adapted pinhole diaphragm. Laser scanners have, however, several disadvantages compared to microscopes with wide field optic. For example, in fluorescence microscopy, excitation saturation and a strong blanching of fluorophores can occur because of the high radiation intensity in the focus. Further, there are significant restrictions in the selection of the wavelength. Additional disadvantages are: many movable components, a high adjustment complexity and a low quantum efficiency of the detector which, as a rule, is a photomultiplier.

A method and an arrangement for the depth selection of microscope images is described in German patent publication 199 30 816. In this method and arrangement, a one-dimensional periodic grating (for example, a striped grating) is used for illumination. At least n (n>2) CCD-camera recordings are made. The structure of the illumination is shifted in each case by 1/n of the grating constant. From the at least three recordings, a confocal section of the specimen is thereafter computed. This method is subject to artefacts when the grating does not generate a sinusoidally-shaped illumination intensity on the specimen.

U.S. Pat. No. 6,376,818 discloses an imaging system and imaging method for microscopes wherein a structured illumination by means of superposition of two coherent light beams is provided. The method, like the method of German patent publication 199 30 816, has primarily the objective of generating optical sections in different object planes in the same manner as in a laser scanning microscope.

Both methods pursue the objective to obtain a depth resolution of thick specimens. The methods function to obtain confocal sections of a specimen or of an object, which is thick in comparison to the depth of field, with a wide field optic. In both cases, the computation complexity is relatively,large because trigonometric equations must be solved.

Published German patent application 103 30 716.8 discloses an arrangement for carrying out a method of eliminating stray light in the imaging of heterogeneous, luminous or illuminated flat objects. The arrangement includes a beam source having a downstream illumination optic homogenizing the beam for homogeneously illuminating a downstream field diaphragm plane wherein a structured field diaphragm is mounted for generating an illumination structure superposed on the object or specimen. This illumination structure is imaged via first optic means onto the specimen. This first optic means can include an illumination tube, a color divider as may be required and an objective. In addition, second optical means are provided for imaging the specimen together with the superposed illumination structure onto a position-resolving detector, especially, for optical radiation. The arrangement further includes adjusting means with which the illumination structure can be positioned in a defined manner in the object plane on the object or on the specimen. The detector is connected to an evaluation unit for determining and eliminating the stray light. A structured bright field illumination with at least two different illumination patterns is used wherein dark regions do not overlap. From corresponding images, a dark image and a bright image can be determined. The resulting image can be obtained by subtracting the dark image from the bright image.

The structured bright field illumination is provided by this arrangement. With this bright field illumination, the object illumination and the imaging of the object take place together with the illumination of the field diaphragm structure via a single objective. The bright field illumination can cause the excitation light in the objective to bring about the occurrence of stray light, especially, because of inherent fluorescence of the glasses used. Furthermore, the rear side of an object (for example, a biochip) is radiated with almost the same excitation intensity as the focus plane. For this reason, the fluorescence intensity, which is caused by the contamination on the rear side, can also be correspondingly high and lead to measurement errors. It was therefore suggested in a second method for avoiding these disadvantages that a structured dark field illumination be used in lieu of the bright field illumination.

With these two methods, it is, however, necessary to carry out an interpolation between non-illuminated regions in order to obtain a complete dark light image, that is, stray light image.

SUMMARY OF THE INVENTION

For the reasons advanced above, the present invention therefore has the object to suppress the influence of stray light on measurements and observations in a method for imaging an object by means of a wide field optic wherein the sought-after information lies within the depth of field of the objective used for imaging. It is a further object of the invention to provide an imaging arrangement to carry out the method of the invention.

The object of the invention is solved with a method for imaging an object by means of a wide field optic on a position-resolving detector for optical radiation with suppression of stray light. In this method, the object is illuminated in at least one object plane with at least two illumination patterns and for each of the illumination patterns corresponding images are detected. In the object plane, the illumination pattern has respective dark regions and bright regions. For a superposition of the illumination patterns in the object plane, the dark regions completely cover the object. In the method, a dark image and a bright image of the object are generated from the detected images and the dark image is subtracted from the bright image.

The object of the invention is further solved with an arrangement for detecting an image of an object wherein stray light influences are suppressed. The arrangement includes an illumination unit for illuminating the object at least in one object plane and a unit for generating at least two pregiven illumination patterns which unit includes an element acting as a structured diaphragm and mounted in the beam path downstream of the illumination unit. The illumination patterns have respective dark regions and bright regions in the object plane. The dark regions completely cover the object when superposed. The arrangement further includes an imaging optic for imaging the object plane onto an image plane and a position-resolving detector mounted in the image plane for detecting the optical radiation emanating from the object. The arrangement further includes an evaluation unit for evaluating the detection signals of the detector and, by means of these signals, a dark image can be determined from images detected during the radiation with the illumination patterns. Also by means of these signals, the arrangement subtracts the dark image from a bright image of the object.

The method of the invention can be carried out with the arrangement of the invention and functions for imaging objects, preferably broad surface objects and especially heterogeneous, luminescent or illuminated objects. This method can be especially a microscopy method.

In the method of the invention, the object is illuminated with at least two structured illumination patterns. In the context of the invention, the object is, depending upon the size of the imageable region in the object plane, an entire specimen or a complete item or only a part region of an entire specimen or of a complete item which is to be investigated or to be imaged. For this purpose, in the arrangement according to the invention, the illumination unit for outputting the illumination light and the unit for generating at least two pregiven illumination patterns are provided. In the context of the present invention, the illumination light can include, in addition to visible light, infrared or ultraviolet light. The illumination patterns are especially for the structured illumination of the object at least in the object region which is to be imaged. The unit for generating the illumination patterns includes especially an element acting as a diaphragm and this element functions preferably as a field diaphragm.

The element has regions which are light transmissive (that is, transparent) and light non-transmissive (that is, opaque) regions. These regions correspond to the respective bright and dark regions in the illumination patterns and these bright and dark regions are disposed next to each other. Correspondingly, with the illumination light, illuminated and non-illuminated regions occur in the object or on the object.

In the method, the object is sequentially illuminated with only one of the illumination patterns. The illumination patterns, which are used in the method, are so selected that their dark regions completely cover the object for an imaginary or fictitious superposition of the illumination patterns.

The object with the particular illumination pattern is then imaged by means of the imaging optic onto the position-resolving detector which functions to detect the images of the object. The imaging optic can especially include an objective. Preferably a CCD-matrix or CMOS-matrix is used as a position-resolving detector.

The signals of the position-resolving detector are processed to images by the evaluation unit especially a data processing unit having a video interface and a processor.

In each detected image, from the illuminated regions of the object which are illuminated by bright regions of the particular illumination pattern, insofar as present, light components, which correspond to the stray light, are directed into the regions of the image of the object which correspond to the dark regions of the particular illumination pattern on or in the object (that is, the unilluminated regions of the object). In these regions of the image, the components are then detected as stray light. The dark regions of the illumination patterns completely cover the object during superposition of the illumination pattern. For this reason, a dark image or stray light image of the total object can be obtained from the dark regions of the images without interpolation with the image containing all of the stray light components to be eliminated. This dark light image (that is, stray light image) is subtracted from the bright image of the object which is generated based on the detection signals of the detector whereby a resulting image arises in which the stray light is suppressed.

For this purpose, no interpolation between the images of the unilluminated regions or dark regions is needed in the object plane.

Furthermore, the method of the invention is characterized by its simplicity because, in addition to the formation of the dark images and, as may be required, bright images, only a subtraction of intensity values is necessary. These steps are carried out significantly more rapidly with computers but also with simple processors or even non-programmed circuits than are trigonometric operations.

For generating the dark image, preferably regions of the detected images are joined together which are images of the dark regions of the object during illumination with the illumination patterns. The dark regions of the object are those regions of the object which lie in the dark regions of the illumination pattern when there is illumination with a particular illumination pattern. A joining here is understood also to be that the images of the dark regions of the object can partially overlap. The joining of the regions of the detected images can also be viewed as an image assembly. During joining, the regions are arranged relative to each other in accordance with the arrangement of the corresponding dark regions on the object. The joining can, for example, take place via addition of the images. In this way, the dark image can be obtained very easily. If the dark regions of the illumination patterns overlap, then there can be an averaging over the redundant component regions of the images of the dark regions from different images. For example, the sum of the images of the particular dark region can be corrected in the overlapping regions via corresponding resealing.

The dark image is preferably joined from component regions of the detected images which are images of the dark regions of the object when there is illumination with the illumination patterns and border next to each other essentially without overlapping. For this purpose, the illumination patterns are preferably so configured on the object and with superposition so aligned with respect to each other that the dark regions essentially border on each other without overlapping when there is superposition of the illumination patterns. In this way, the complexity for a correction can be avoided or at least greatly reduced. This correction is desirable because of an overlapment of the component regions.

The dark image is preferably computer smoothed in a method of the invention for reducing noise effects. This possibility constitutes an essential advantage of the method of the invention relative to other methods using a structured illumination. In these other methods, no complete dark image is generated or can be generated during the data evaluation.

The bright image can be generated in different ways. In one embodiment of the method of the invention, it is preferred to generate the bright image by detecting an image when there is an unstructured illumination. This procedure permits an especially rapid processing of the detected images because the bright image need not first be generated from several components. Furthermore, greater freedom exists with the selection of the illumination patterns because the bright images of the illumination patterns need not cover the object in the object plane for superposition of the illumination patterns.

In order that it be necessary to detect only the smallest possible number of images, in the method of the invention, the bright image is preferably generated from the images detected during illumination with the illumination patterns. The illumination patterns have bright regions which completely cover the object in the object plane during a superposition of the illumination patterns. In the arrangement of the invention, it is preferred to configure the unit for generating at least two pregiven illumination patterns for generating illumination patterns with bright regions. These bright regions completely cover the object in the object plane with the superposition of the illumination patterns and, in the arrangement, the bright image can be generated from the images detected during illumination with the imaging patterns by means of the evaluation unit. As already mentioned in connection with the dark regions, the bright regions cover the object in an imagined superposition of the illumination patterns, but actually the object is irradiated sequentially with different illumination patterns.

For generating the bright image, regions of the detected images are joined together which are images of the bright regions of the object during illumination with the illumination patterns. As already explained for the formation of the dark image, in the case wherein the bright regions of the illumination patterns overlap on the object or in the object plane, there can be an averaging over the redundant component regions of the images of the bright regions from various images. For example, when summing the images of the bright regions, a resealing can be carried out in the overlapping regions in order to correct effects of a double detection in these regions.

The bright image is especially advantageously joined from component regions of the detected images which are images of the bright regions of the object during illumination with the illumination patterns and which border one another essentially without overlapping. For this purpose, the illumination patterns are so configured on the object and are aligned with respect to each other during superposition that the dark regions during superposition border one another essentially without overlapment. In this way, the complexity of a correction, which is desirable because of an overlapment of the component regions, is avoided or at least greatly reduced.

The bright image can preferably be generated via additive superposition of all images which are detected during illumination with the illumination patterns. Preferably, a scaling with the additive illumination intensity is then undertaken.

The illumination patterns can, in principle, be selected as desired if the dark regions and bright regions exhibit the characteristics mentioned above. In the method of the invention, however, the illumination patterns are preferably given by a basic pattern which is offset relative to the object differently in each case. The illumination patterns therefore have the same structure but are offset with respect to each other in the object plane. Such illumination patterns are easy to generate. Furthermore, the evaluation of the images, which are generated in each case with the illumination patterns, is especially simple.

The offset of the illumination patterns relative to the object can be achieved in different ways.

In a preferred embodiment of the method of the invention, the object is shifted relative to the illumination pattern. In the arrangement of the invention, a drive, with which the object or an object carrier is moveable, can be so controlled by the evaluation unit that a basic pattern forms one of the illumination patterns on the object shifted by the movement. The basic pattern is generated by the element acting as a structured diaphragm. Also, by means of the evaluation unit, images can be detected automatically after each position change of the object. Piezoactuators or eccentric drives can preferably be used as drives and allow a very precise positioning. The drive can, if needed, also be used for positioning the object relative to the optic which is anyway needed. Preferably, a motorically moveable microscope stage can be used which is anyway present. The movement by the drive can, depending upon the illumination patterns used, be possible in one or two directions along the object plane. The evaluation unit can especially be configured to generate a sequence of illumination patterns on or in the object by driving the drive. After adjusting the particular illumination pattern, an image is detected. In this way, the operation is significantly simplified for the user of the arrangement. Furthermore and with corresponding programming of the evaluation unit, the dependency, which is necessary because of the method between the type of illumination patterns and the needed shifting, is automatically considered.

To avoid a movement of the object relative to the detector, the basic pattern can preferably be displaced by means of a mechanical unit as an alternative to the described variation. In the arrangement of the invention, it is preferable that a field diaphragm be used as the element operating as a structured diaphragm. A drive with which the field diaphragm or a part of the field diaphragm is moveable is so controllable by the evaluation unit that the illumination patterns are radiated onto the object. After each change of the illumination pattern, images are automatically detected by means of the evaluation unit. A field diaphragm is here especially understood to be a diaphragm which has rigid, nontransparent or opaque elements for forming the structured illumination.

Alternatively to the movement of the illumination patterns, it can be provided that the element, which functions as a structured diaphragm, be a field diaphragm and, to generate the at least two illumination structures, a moveable, light-deflecting element is mounted rearward of the field diaphragm. The field diaphragm can be fixedly positioned. A reflecting surface or a transparent plane-parallel plate can be used especially as a light deflecting element. Depending upon the illumination pattern used, this reflecting surface or plane-parallel plate is tiltable about an axis or two orthogonal axes. As a drive, preferably piezoelectric drives or eccentric drives are used. To adjust the illumination pattern and to simplify the detection of the corresponding images, a drive, with which the light deflecting element can be moved, is so controllable by the evaluation unit that the illumination patterns are radiated onto the object. Images are automatically detected after each change of the illumination pattern by means of the evaluation unit. This embodiment has the advantages mentioned above in connection with the automatic drive.

In both embodiments, the field diaphragm exhibits transparent and opaque regions which are so configured that the wanted illumination patterns are obtained in the object plane.

If the use of mechanical means for shifting the basic pattern is to be avoided, an electrically controllable modulation unit for light can be provided which is so driven that the illumination patterns are generated. In the arrangement of the invention, for example, the element, which acts as a diaphragm, can be configured as one such electronically driveable modulation unit. As electrically driveable units for light, for example, so-called DMDs ("digital mirror devices") or electronically driveable transparent light or reflection liquid crystal fields or LCDs can be used. As above, the evaluation unit is preferably so controllable that the illumination patterns are radiated onto the region to be investigated and, after each change of the illumination pattern, images are automatically detectable by means of the evaluation unit. This embodiment of the invention permits not only to eliminate mechanical drives but permits also a simple exchange between different illuminating pattern types. Furthermore, it is also easily possible to illuminate the object unstructured so that a bright image is directly detectable.

The illumination patterns themselves can exhibit different structures.

For example, illumination patterns with radially extending bright and dark regions can be used which are generated, in each case, by a rotation of a corresponding basic pattern about a center point by a pregiven angle.

With the use of mechanically adjustable elements, which act as a diaphragm, illumination patterns are preferably used having periodically alternating stripe-shaped bright and dark regions which are offset transversely to the direction of the stripes. The stripes extend preferably over the entire region of investigation or the entire object. In order to achieve coverage of the object with the dark fields, the bright stripes are preferably narrower than the dark stripes of the illumination patterns. Depending upon the number (n) of the illumination patterns used and the corresponding number of images to be detected, the stripe pattern is preferably selected in the following manner. If p is the period of the stripe pattern, the widths h of the bright stripes are selected to be less than $p/(n-1)$ and greater than $p/n$, but selected as close as possible to $p/n$. The quantity h should preferably be so great that diffraction effects are not a disturbance in the joining assembly of the bright image. The offset v of the illumination patterns or a basic pattern, which is the basis of the illumination pattern, is so selected that the dark regions of the illumination patterns with superposition cover the entire object preferably at approximately $p/n$. To avoid diffraction effects in the dark image, the dark stripes are selected as wide as possible. Their width d is, however, greater than $p \cdot (n-2)/(n-1)$ and less than $p \cdot (n-1)/n$. The more illumination patterns are used the less excitation light is used in the detection of a corresponding image. In this way, the intensity noise in the background of the resulting image can be reduced virtually as desired. In the arrangement of the invention with a field diaphragm, the field diaphragm preferably has a stripe-shaped structure of mutually alternating transparent and opaque regions. The dimensions of the transparent and opaque regions are so selected that illumination patterns having the above-mentioned parameters can be generated. When utilizing an electrically driveable modulation unit, a corresponding configuration or programming of the evaluation unit is sufficient for generating for these illumination patterns.

Alternatively, illumination patterns can be used with an arrangement of bright and dark regions periodic in two directions for each of the illumination patterns. The arrangements are offset relative to each other in at least one of the directions. With the use of a mechanically displaceable field diaphragm, the field diaphragm preferably has an arrangement of transparent and opaque regions periodic in two directions. The opaque regions border one upon the other. When using an electrically driveable modulation unit, a corresponding configuration or programming of the evaluation unit is sufficient to generate these illumination patterns. The directions can be orthogonal to each other but this need not necessarily be the case. In this embodiment, the designation of a direction by utilizing stripes is avoided so that the suppression of stray light is less directionally dependent. Furthermore, the modulation because of the structured illumination vanishes more rapidly outside of the focus plane or object plane so that light outside of the depth of field of the imaging optic is better suppressed.

If periodic illumination patterns are used, it is possible that in the image freed of stray light, illumination inhomogeneities are still present which are caused by the periodicity of the illumination patterns. It is therefore preferred in the method of the invention that the image, which arises from subtraction of the dark image from the bright image, is filtered at low frequency. Low frequency is here understood to be that the filtering takes place at frequencies less than the frequency or frequencies which are given by the periodicity of the illumination pattern.

If an object is to be investigated with a dark field illumination (which can be especially desirable for fluorescence microscopy), the illumination optic for imaging the element on the object, which element acts as a diaphragm, is configured for a dark field illumination.

In the arrangement of the invention, the illumination optic should then be configured as an illumination optic having a small aperture. The optical axis of the illumination objective and the optical axis define an angle α. The optical axis is defined by the imaging optic. This configuration yields a large depth of field range. The angle α should preferably be greater than 500 in order to minimize the radiation intensity on the underside of transparent objects or specimens.

Preferably, the illumination optic is a Scheimpflug optic in this case. A greater numerical aperture can be provided for the dark field illumination because the focus plane of the illumination can be adapted to the upper side of the specimen.

In addition, the imaging optic for imaging the object on the detector can include a Scheimpflug optic. In this case, the optical axis of the illumination objective is perpendicular to the surface of the specimen while the optical axis of the imaging objective is at an angle α to the optical axis of the illumination objective.

The method as well as the arrangement, with which the method can be carried out, can be advantageously used for reading out biochips in fluorescence microscopy and for photometric measurements.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
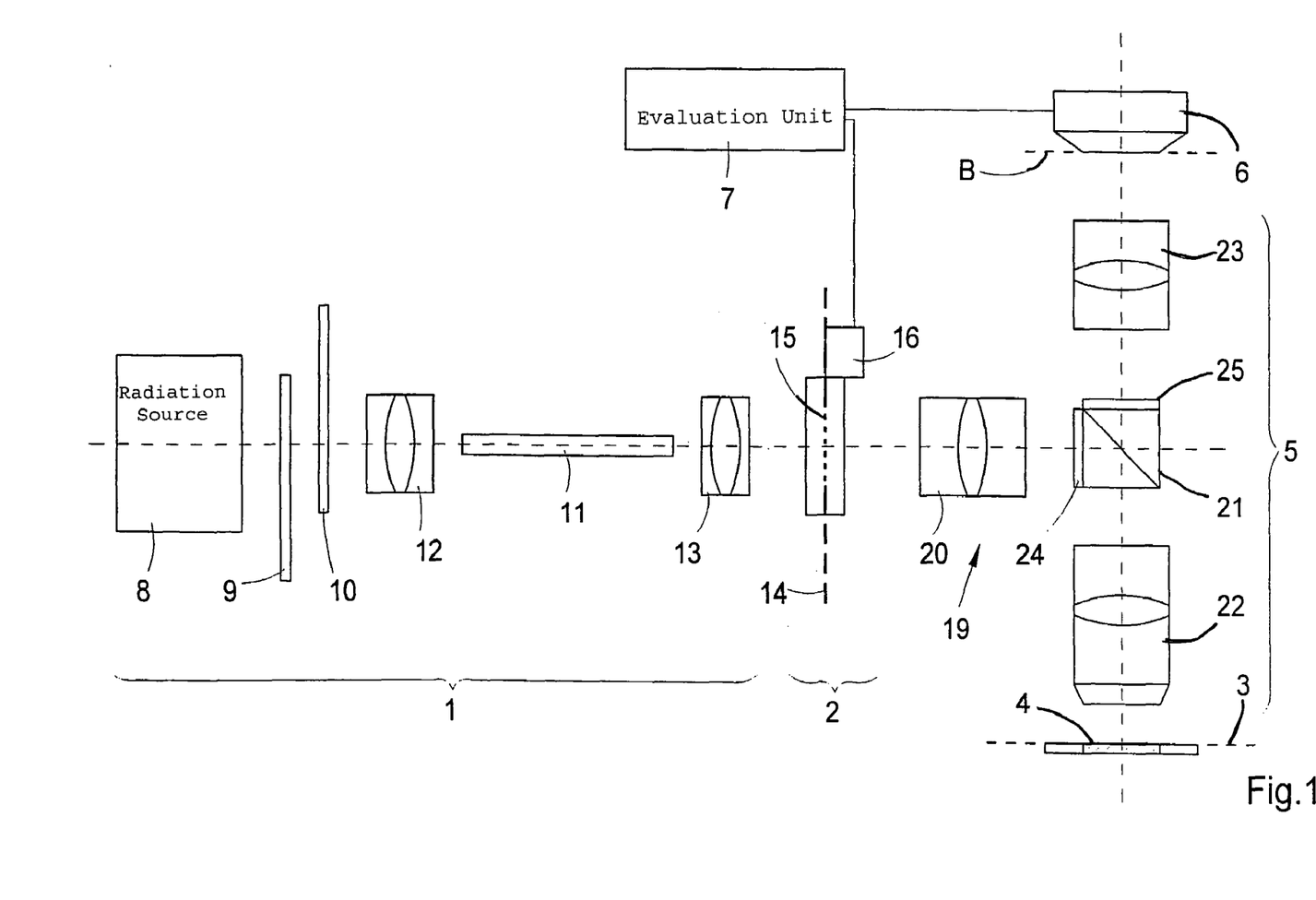
FIG. 1 is a schematic of an optical configuration of an arrangement for detecting an image of an object in accordance with a first preferred embodiment of the invention.

FIG. 1 shows an arrangement for detecting an image of a heterogeneous luminescing or illuminated broad surface object wherein stray light influences are suppressed. The arrangement of FIG. 1 is a first preferred embodiment of the invention and includes an illumination unit 1, a unit 2 for generating illumination patterns in an object plane 3 of an object 4 arranged on a carrier or table. The unit 2 is mounted downstream of the illumination unit 1 and the arrangement further includes an imaging optic 5 for imaging the object 4 on an image plane B and a position resolving detector 6 arranged in the image plane. An evaluation unit 7 is connected via a detector connection to the detector 6 and via a control line to the unit 2.

The illumination unit 1 includes a light or radiation source 8. The following are arranged downstream of the source 8: a filter 9, a shutter 10, elements 11 and first illumination optics 12 and 13 for homogeneously illuminating a region of a field diaphragm plane 14. The optical elements 11 are only optional and homogenize the beam path and can, for example, be a light conductor rod or a hollow glass rod mirrored on the inside.

The unit 2 includes an element which, in this embodiment, is a structured field diaphragm 15, and a drive 16 with which the field diaphragm 15 can be displaced. The element 15 is arranged in the beam path of the illuminating unit 1 and can be homogeneously illuminated by the illuminating unit 1 and acts as a structured diaphragm and is arranged so as to be displaceable in the beam path in two mutually orthogonal directions in the field diaphragm plane 14.

Figure 2:
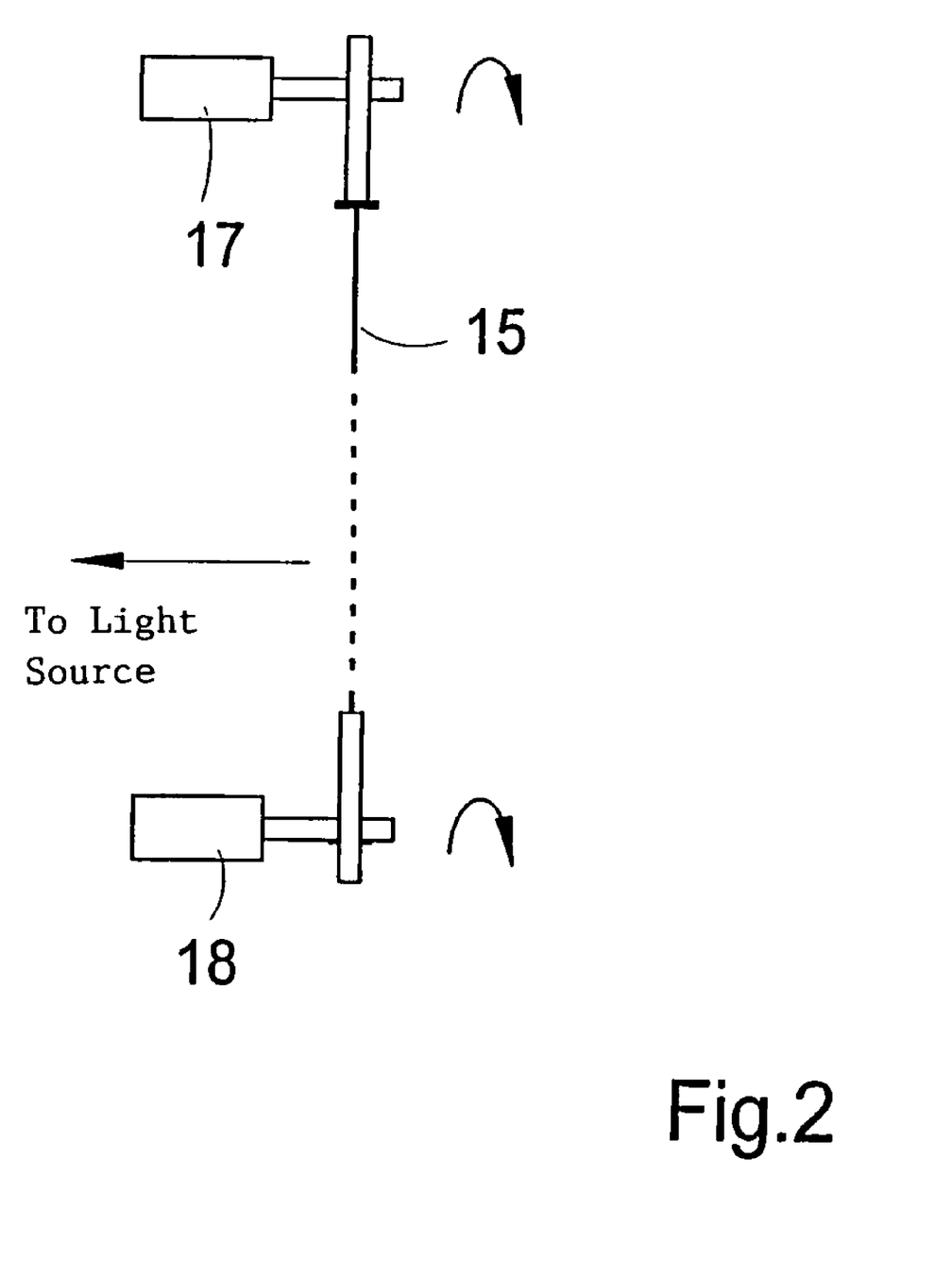
FIG. 2 is a partial schematic of a unit for generating illumination patterns with a field diaphragm with an eccentric drive in the arrangement of FIG. 1.

The mechanical configuration of the unit 2 for generating illumination patterns is shown in greater detail in FIG. 2. Eccentric drives 17 and 18 are so coupled to the field diaphragm 15 that the field diaphragm can be laterally displaced in the field diaphragm plane 14 in two mutually orthogonal directions and is, in this way, positioned in a defined manner.

The field diaphragm 15 has strip-shaped opaque regions which are arranged periodically. These opaque regions are separated by transparent regions from each other so that corresponding strip-shaped illuminating patterns are generated in the object plane 3 as will be explained in greater detail hereinafter.

As also shown in FIG. 1, the field diaphragm 15 is imaged onto the object 4 or object plane 3 via a second illumination optic 19 so that an illumination pattern is radiated onto the object 4 which corresponds to the position of the field diaphragm 15 in the field diaphragm plane 14 and to its structure. The second illumination optic 19 is mounted downstream of the element 15 and includes an illuminating tube 20, a beam splitter 21 and an objective 22. The object 4 is to be imaged or investigated.

The imaging optic 5 defines a wide field optic and includes, in the embodiment shown, the objective 22, the beam splitter 21 and an imaging tube 23. The imaging optic 5 images the object 4 rich in contrast on the image plane B or the position-resolving detector 6 for optical radiation. The object 4 is illuminated with the particular illumination structure.

In this embodiment, the beam splitter 21 is configured as a color splitter and has filters 24 and 25 with which unwanted or disturbing spectral radiation components can be filtered out. The beam splitter 21 and the filters 24 and 25 are components in an arrangement for incident fluorescence. Here, it is advantageous when the filters 24 and 25 are positioned at an incline by several angular degrees in order to remove disturbing reflexes from the beam path.

The detector 6 includes a matrix of CCD-elements or CMOS-elements and is a component of a CCD-camera in this embodiment.

The detector 6 is connected to an evaluation unit 7 which detects signals of the detector 6. The evaluation unit 7 carries out the determination or elimination of the stray light when imaging the object 4 and generates a resulting image. For this purpose, the evaluation unit 7 has a processor, a memory and corresponding interfaces. The resulting images can be stored and/or can be outputted via a display device (not shown in FIG. 1) or a printer.

The evaluation unit 7 also functions as a control for the drive 16 with which the illumination structure is displaceable, the illumination structure being generated by the structured field diaphragm 15. The evaluation unit 7 is so configured that it generates a sequence of illumination patterns via the controlled driving of the drive 16 and the shutter 10 and, by detecting the signals of the detector 6, the evaluation unit detects a sequence of images of the region under investigation or of the object 4 which images correspond to the particular illumination patterns. These images are processed in the evaluation unit 7 after the detection of the last image of the sequence.

Figure 3:
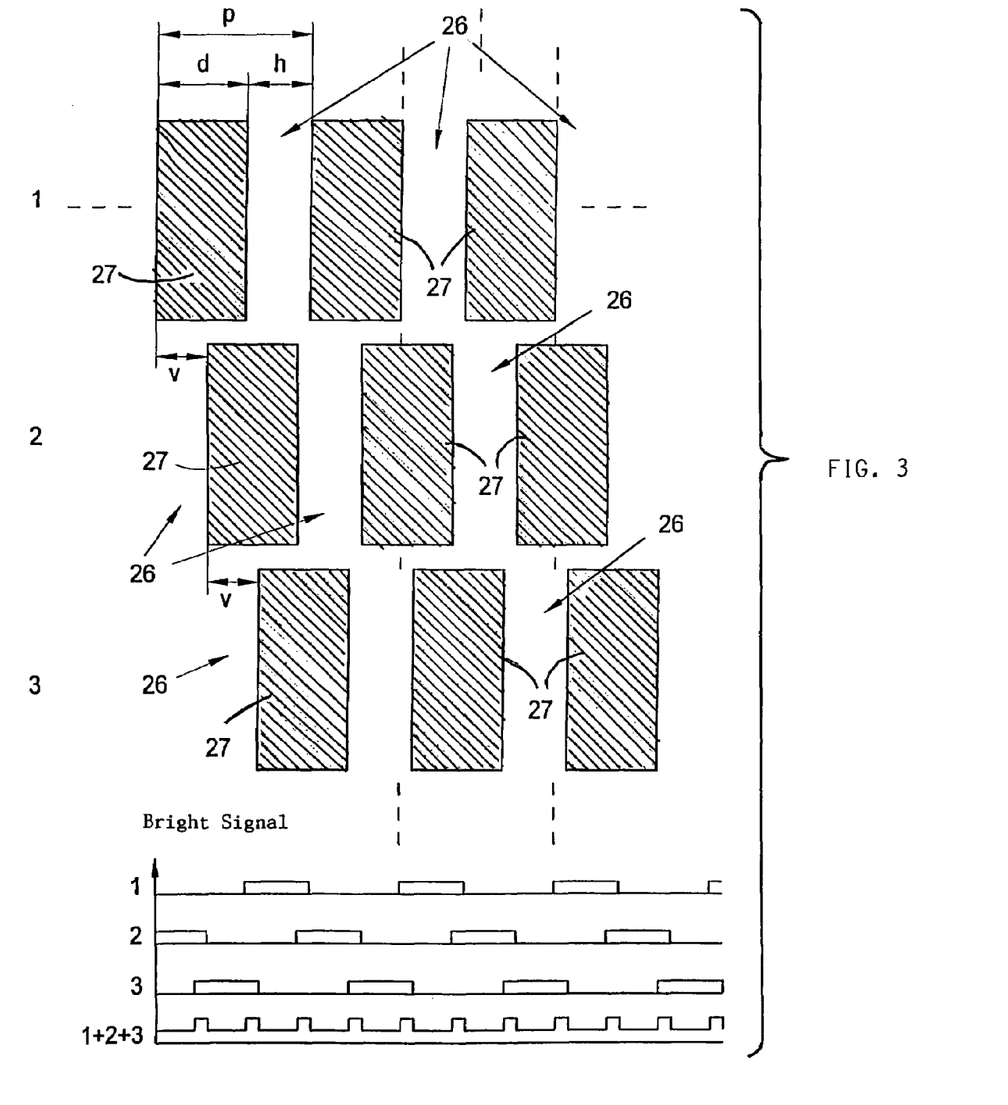
FIG. 3 shows three illuminating patterns and corresponding waveforms of signals of a detector of the arrangement of FIG. 1 when illuminating a homogeneous fluorescing object with these illumination patterns with the illumination patterns being obtained with the field diaphragm of the arrangement of FIG. 1.

In the execution of the method according to a first preferred embodiment of the invention, three illumination patterns are used which are shown in detail in FIG. 3. The three illumination patterns correspond to the structure of the field diaphragm 15.

The first illumination pattern is a basic pattern. The other illumination patterns are derived from the basic pattern by shifting the basic pattern by the distance (v). The basic pattern has a periodic structure of the period (p) with stripe-shaped dark regions 27 having the width (d) and stripe-shaped bright regions 26 of a width (h) arranged between each two mutually adjacent ones of the dark regions. The parameters (p, d, h) are so selected that the widths (h) of the bright regions 26 lie between one third and one half of the period (p), that is, ⅓ p and ½ p. Correspondingly, the widths (d) of the dark regions 27 lie between ½ p and ⅔ p.

The basic pattern is shifted twice by the distance (v) in a direction which is orthogonal to the longitudinal direction of the stripe-shaped dark regions 27 or stripe-shaped bright regions 26. The distance (v) by which the sequential illumination patterns are displaced relative to each other has approximately the length of one-third of the period (p). The illumination pattern arises because of the shift of the basic pattern.

The period (p) lies preferably between 1 μm and 100 μm on the side of the specimen.

The area of investigation or the object 4 is completely covered over by the dark regions 27 with superposition of the three illumination patterns in the object plane 3. By bringing the dark regions 27 together, the object 4 is therefore completely covered thereby so that no interpolation between the dark regions 27 is necessary.

The same applies to the bright regions 26.

The object 4 in the object plane 3 is illuminated sequentially with the three illumination patterns in a method for imaging an object by means of a wide field optic onto a position-resolving detector for optical radiation with suppression of stray light in accordance with a first preferred embodiment of the invention. For this purpose, the evaluation unit 7 correspondingly drives the drive 16 and the shutter 10. For each illumination pattern, a corresponding image is automatically detected by means of the detector 6 and the evaluation unit 7. The detected images exhibit a brightening because of stray light in the regions into which the dark regions 27 are imaged. The stray light is outputted from sections of the object 4 illuminated by bright regions 26.

A bright image of the object is then generated from the detected images in the evaluation unit 7. For this purpose, the regions of the detected images are joined via summation to a bright image of the object 4. These detected images were obtained from imaging the bright regions 26 into the object plane 3 or onto the object 4. The arrangement of the regions of the detected images to each other corresponds to the arrangement of the dark regions of the illumination patterns on the object 4 with the dark regions corresponding to the arrangement of the regions of the detected images. Since the bright regions 26 overlap, intensity excesses arise with the summation in the overlapping regions with these intensity exaggerations being eliminated via referencing or rescaling. This is shown by way of example for the case of a homogeneous fluorescing object in the diagram in FIG. 3. In FIG. 3, the bright signals for each of the illumination patterns (identified by the numerals 1, 2 and 3, respectively) are shown as functions of the location for a section through the object plane 3 as well as the bright signal (1+2+3) resulting from summation.

In another preferred embodiment of the method, only partial images of the images of the bright regions 26 are used which mutually border on one another when the detected images are superposed or which overlap only minimally. If required, a rescaling can additionally take place.

To determine a dark light image or stray light image, the regions of the detected images (which images were obtained via imaging of the dark regions 27 in the object plane 3 or in the object 4), are joined or summed to a dark light image or stray light image without interpolation being necessary. The dark image is mathematically smoothed for noise suppression while utilizing a corresponding lowpass filter.

Finally, the dark image is subtracted from the bright image in the evaluation unit 7. A resulting image of the object 4 arises in which stray light is suppressed.

In a second preferred embodiment of the method of the invention and/or arrangement of the invention, four illumination patterns are used which originate from a basic pattern having a periodic stripe structure by successive displacement by a distance (v) in a direction orthogonal to the direction of the stripes. The widths (h) of the bright regions, the widths (d) of the dark regions and the distance (v) can be selected at period (p) of the stripe structure in the following manner:

$$\tfrac{1}{4}p < h < \tfrac{1}{3}p,\ v = \tfrac{1}{4}p\ \text{and}\ \tfrac{2}{3}p < d < \tfrac{3}{4}p.$$

Four images are detected in correspondence to the number of illumination patterns. These four images are processed in the same manner as in the first embodiment for suppressing stray light.

By using five illumination patterns (which arise from a periodic basic pattern having stripes because of a shift by the distance (v) in a direction orthogonal to the direction of the stripes), the widths (d) and (h) of the dark regions and bright regions, respectively, and the shift can, for example, be selected as follows:

$$\tfrac{1}{5}p < h < \tfrac{1}{4}p,\ v = \tfrac{1}{5}p\ \text{and}\ \tfrac{3}{4}p < d < \tfrac{4}{5}p.$$

The more illumination patterns that are used, the less excitation light is used in the detection of a corresponding image. In this way, the intensity noise in the background of the resulting image can be reduced virtually as desired.

In a third preferred embodiment of the method of the invention and arrangement of the invention, the field diaphragm 15 is not moved, instead, the object 4 is moved. For this purpose, a table or stage can be used on which the object is mounted and which stage can be moved by means of a drive in directions parallel to the object plane 3. The drive is driven by the evaluation unit 7. The evaluation of the detected images takes place in the same manner as in the first embodiment. To position the object 4 in the object plane 3, the following can be used as drives: piezoactuators, eccentric drives or other suitable adjusting mechanisms, preferably, however, a motorized microscope stage.

An arrangement of a fourth preferred embodiment of the invention differs from the arrangement of the first embodiment in that a modified unit 28 (see FIG. 4) for generating illumination patterns and a correspondingly modified evaluation unit are used. Since the other components are essentially unchanged, the same reference numerals are used and the descriptions with respect thereto provided in the first embodiment are applicable.

Figure 4:
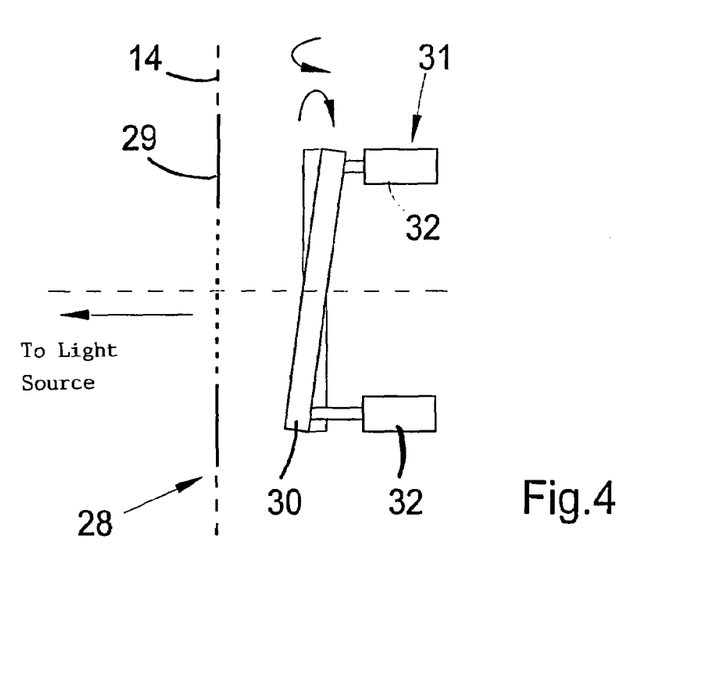
FIG. 4 is a partial schematic of a unit for generating illumination patterns in an arrangement for detecting an image of an object in accordance with a fourth preferred embodiment of the invention.
Figure 5:
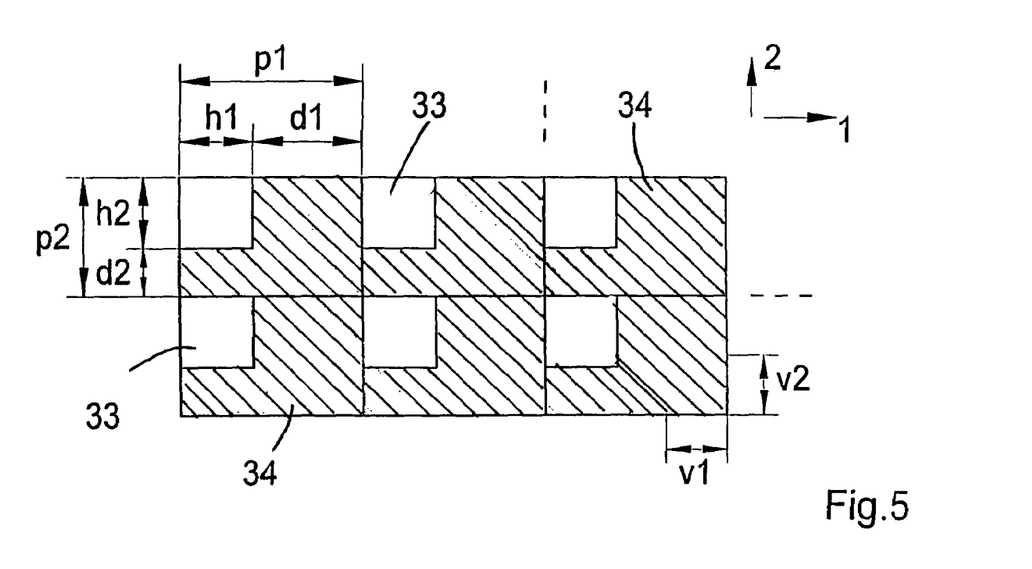
FIG. 5 shows an illumination pattern, which is periodic in two directions, in the arrangement or a method according to the fourth preferred embodiment of the invention.

The unit 28 is shown partially in FIG. 4 and has a field diaphragm 29 as an element functioning as a structured diaphragm. The field diaphragm 29 is mounted in the field diaphragm plane 14 and has periodically configured transparent and opaque regions (see FIG. 5) in two mutually orthogonal directions. To generate different illumination structures, the unit 28 has (as shown schematically in FIG. 4) a planar-parallel glass plate 30 which is tiltable about two mutually orthogonal axes. The glass plate 30 is mounted downstream of the structured field diaphragm 29 in the light direction. In an advantageous manner, piezoactuators 32 are provided as drive 31 to provide a controlled defined tilting of this glass plate 30. The piezoactuators 32 are correspondingly driven by a control of the evaluation unit (not shown). Because of the tilting of the glass plate 30, an optical beam offset of the beam path results in a manner known per se and, therefore, an offset imaging of the field diaphragm 29 on the object 4 results. The arrows, which are shown in FIG. 5, indicate the tilt directions of the glass plate. 30.

Other suitable elements can also be used for generating the beam offset. In another embodiment, also eccentric drives or other suitable driving mechanisms can be provided as drives for the glass plate 30.

When imaging the field diaphragm 29 into the object plane 3, a basic pattern (FIG. 5) results having bright regions 33 and dark regions 34. These regions are periodically arranged in two mutually orthogonal directions. The basic pattern has a period p1 in a first direction indicated by the arrow 1 and a period p2 in the second direction indicated hereinafter by arrow 2. The bright regions 33 are rectangular with side lengths h1 and h2 and together with the L-shaped dark regions 34 form rectangles having edge lengths p1 and p2 which are shown in FIG. 5 by broken lines.

For generating the six illumination patterns in this embodiment, the basic pattern, which itself is a first illumination pattern, is first shifted twice sequentially by the distance v1 in the direction 1, that is, parallel to the side of the bright regions 33 having the length h1. In this way, second and third illumination patterns arise. For generating a fourth illumination pattern, there then follows a displacement by the distance v2 in a direction 2 orthogonally to the direction of the first displacement, that is, parallel to the side of the bright regions having the length h2. Thereafter, two additional illumination patterns are generated by displacing by the distance v1 in each case in the direction of the first displacement.

The magnitude of the displacements v1 and v2 results from the relationship:

$$p1 = 3 \cdot v1 \text{ and } p2 = 3 \cdot v2,$$

and the magnitude of the sides h1 and h2 of the bright regions 33 is obtained from the relationships:

$$\tfrac{1}{3} \cdot p1 < h1 < \tfrac{1}{2} \cdot p1 \text{ and } \tfrac{1}{3} \cdot p2 < h2 < \tfrac{1}{2} \cdot p2.$$

The periods p1 and p2 lie in the object plane, preferably, in the range between 1 μm and 100 μm. The periods can be selected to be equal or they can have different magnitudes.

When the six illumination patterns are superposed, the bright regions 33 thereof cover the object 4 in the object plane 3 completely. The same applies for the dark regions 34.

The method for imaging the object 4 in accordance with the fourth preferred embodiment of the invention takes place in the same manner as in the first embodiment. The six illumination patterns are generated sequentially and corresponding images of the investigative region are detected. The generation of the resulting image takes place as in the first embodiment with the change that the six images, that is, the partial images, which correspond to the dark and bright regions, are applied for determining the dark image and the bright image. The six images are detected with illumination with respectively different corresponding illumination patterns. The resulting image is determined, as before, by subtraction of the dark image from the bright image.

The method affords the advantage relative to the method of the first embodiment (that is, the use of illumination patterns with stripes) that the modulation because of the structured illumination vanishes more rapidly outside of the focus plane or object plane so that the suppression of light outside of the depth of focus of the imaging optic is improved.

Figure 6:
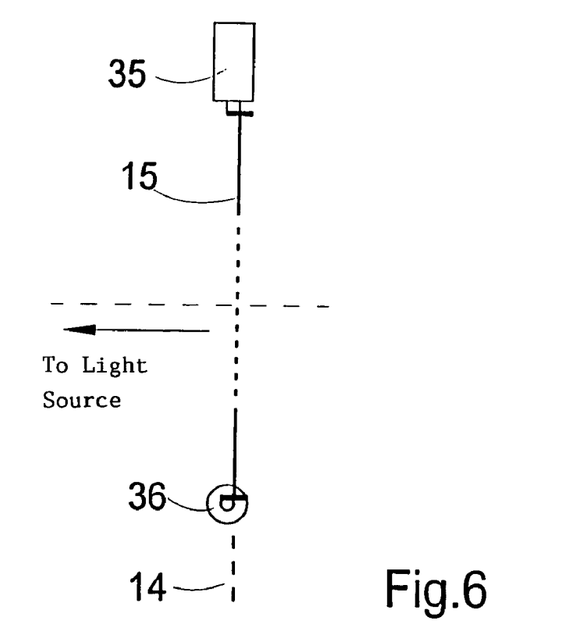
FIG. 6 shows a schematic of a part of a unit for generating illumination patterns in an arrangement for detecting an image of an object in accordance with a fifth preferred embodiment of the invention.

An arrangement for detecting an image of an object in accordance with a fifth preferred embodiment of the invention distinguishes from the arrangement of the first embodiment by providing a different drive for the field diaphragm 15. All other components are unchanged so that the same reference numerals and the same descriptions for the first embodiment also apply here.

FIG 6 shows a view of part of the changed unit for generating illumination patterns. The drive is controlled by the control in the evaluation unit and includes piezoactuators 35 and 36 which are coupled to the field diaphragm 15 so that the field diaphragm 15 can be displaced in a defined manner by a lateral shift in two mutually orthogonal directions in the field diaphragm plane 14. Because of the imaging of the field diaphragm 15, which is adjusted in different positions on the object 4 as before, different illumination structures are generated in the object plane 3 which are then imaged together with the object 4 on the detector 6.

Figure 7:
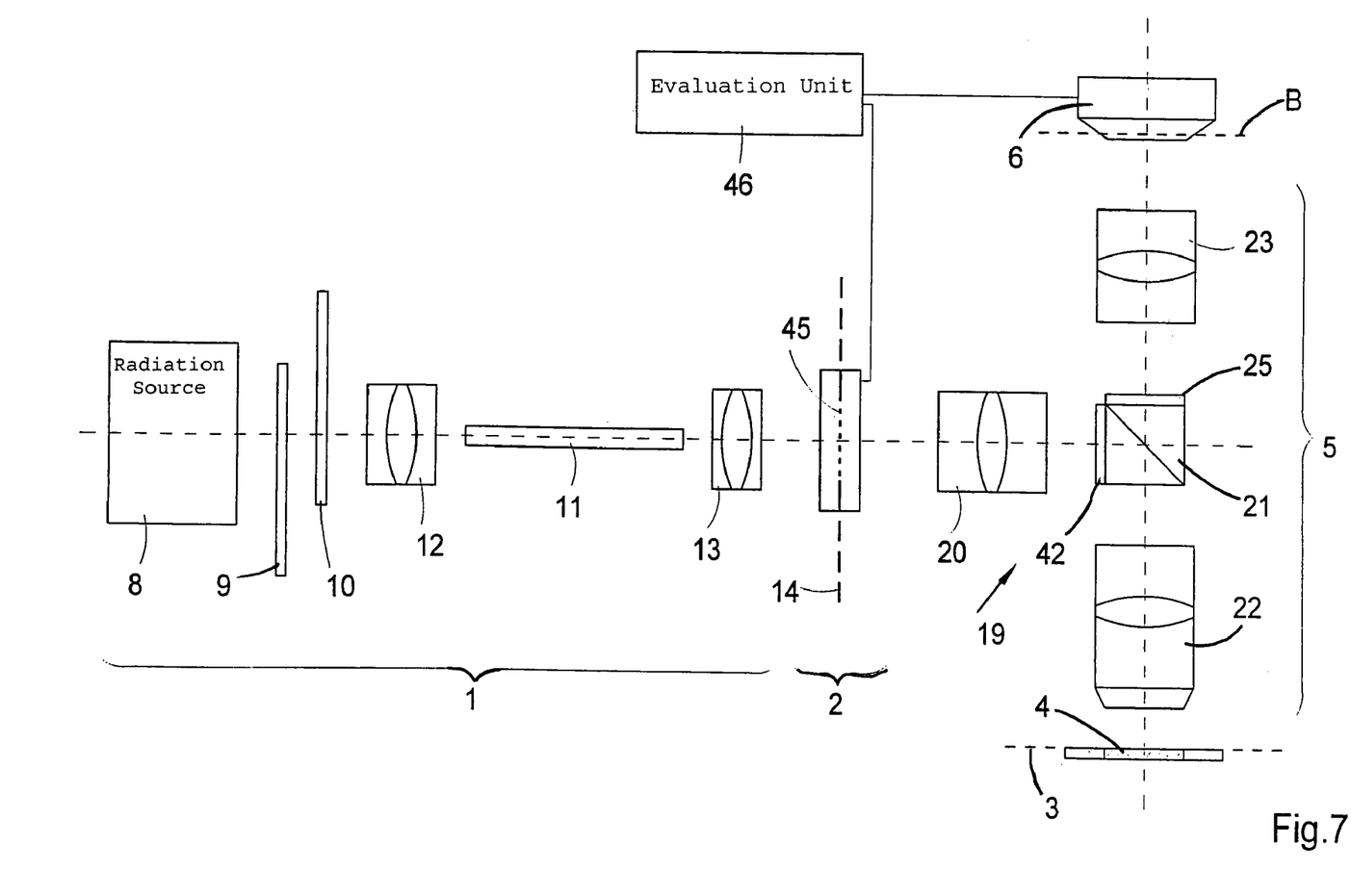
FIG. 7 shows a schematic of an optical configuration of an arrangement for detecting an image of an object in accordance with a sixth preferred embodiment of the invention.

A sixth embodiment of the invention distinguishes from the embodiments described heretofore in that the unit for generating illumination patterns has neither a field diaphragm nor a drive; instead, the unit has an electrically driveable modulation unit 45 in the form of a transmitted light LCD mounted in the field diaphragm plane 14 as an element operating as a structured diaphragm. As shown in FIG. 7, the modulation unit 45 is connected via a control line to an evaluation unit 46 which is modified relative to the evaluation unit 7 of the first embodiment in that, bright-dark patterns stored in the evaluation unit are shown on the transmitted light LCD so that corresponding illumination patterns are radiated onto the object plane 3.

Figure 8:
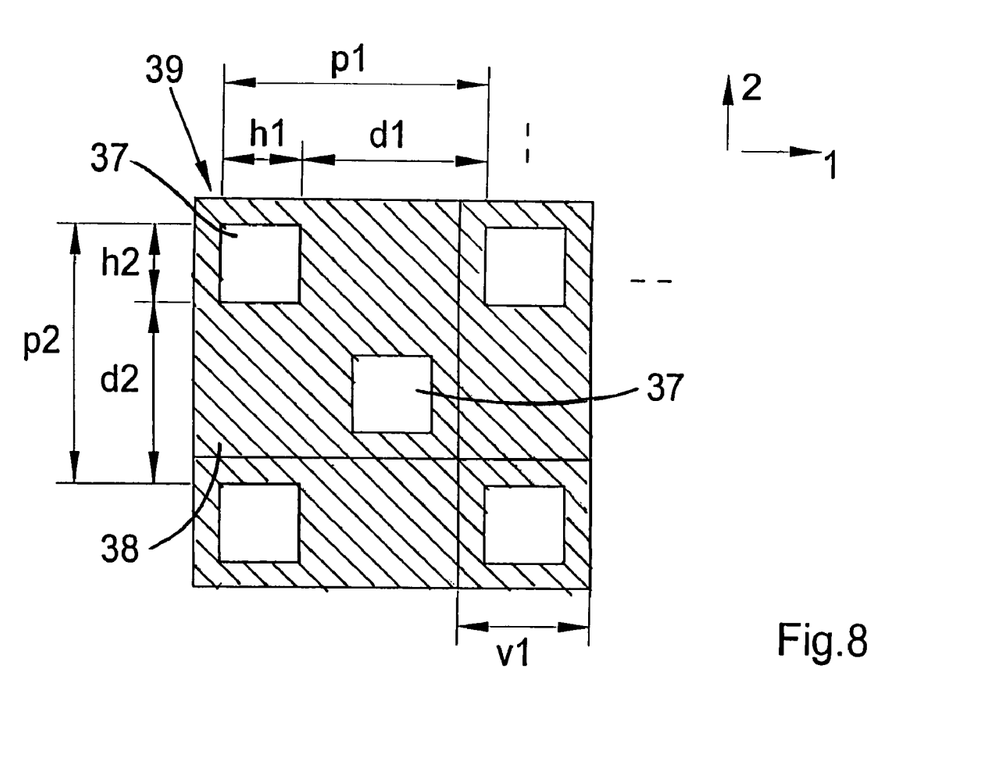
FIG. 8 shows an illumination pattern, which is periodic in two directions, in the arrangement or method according to the sixth preferred embodiment of the invention; and, FIG. 9 shows a schematic of an optical configuration of an arrangement for detecting an image of an object in accordance with a seventh preferred embodiment of the invention.

In this embodiment, on the one hand, two illumination patterns are used, namely, a basic pattern, which has bright regions 37 and dark regions 38 periodically arranged in two mutually orthogonal directions and an illumination pattern arising therefrom via a shift in one of the periodic directions. On the other hand, an unstructured illumination is used in order to detect a bright image.

The basic pattern is shown in more detail in FIG. 8. Rectangular cells 39 are arranged periodically with the periods p1 and p2 in the mutually orthogonal directions 1 and 2. The cells 39 have edges in direction 1 and direction 2 and have edge lengths p1 and p2, respectively. In each of the cells 39, two like rectangular bright fields 37 having edge lengths h1 and h2 are arranged on the diagonals of which one forms a part of the edge of cell 39 with its two edges and the other is so arranged that the bright fields 37 are arranged along a diagonal of the basic pattern at equal distances from each other.

The periods p1 and p2 can be equal or can be different from each other and have a length in a range from 1 μm to 100 μm in the object plane 3. The edge lengths h1 and h2 are so selected that they satisfy the relationships:

$$h1 < \tfrac{1}{2}\cdot p1 \text{ and } h2 < \tfrac{1}{2}\cdot p2$$

In addition, the magnitude of the shift v1 is selected as ½·p1.

For an imagined superposition of the illumination patterns, the dark regions 38 of the two illumination patterns cover the investigative region or the object 4. A dark image can be determined as with the method of the first embodiment when the regions of the images detected during illumination with the two illumination patterns are joined. The regions of the images correspond to the dark regions.

In another embodiment, the bright image is generated by a simple addition of all detected images and a subsequent scaling with the added illumination intensity. Furthermore, possibly occurring illumination inhomogeneities, which sometimes occur because of the periodicity of the illumination patterns, are eliminated in the image obtained by subtraction of the dark image from the bright image in that the resulting image is subjected to a position frequency filtering with a low frequency filter which filters out the frequencies, which correspond to the periodicity, or adjusts its intensity to a value corresponding to the remaining spectrum of the frequencies. Such a filtering can also be carried out additionally in the other embodiments.

In a method for imaging an object by means of a wide field optic on a position resolving detector for optical radiation with suppression of stray light in accordance with the sixth preferred embodiment of the invention, the object 4 is illuminated in the object plane 3 sequentially with the two structured illumination patterns and the unstructured illumination. For this purpose, the evaluation unit 46 correspondingly drives the modulation unit 45. For each of the illumination patterns, a corresponding image is detected by means of the detector 6 and the evaluation unit 7.

For an illumination with an illumination pattern, a dark image is determined from the detected images in the same manner as in the first embodiment. The dark image is subtracted from the bright image detected with unstructured illumination when forming a resulting image.

Figure 9:
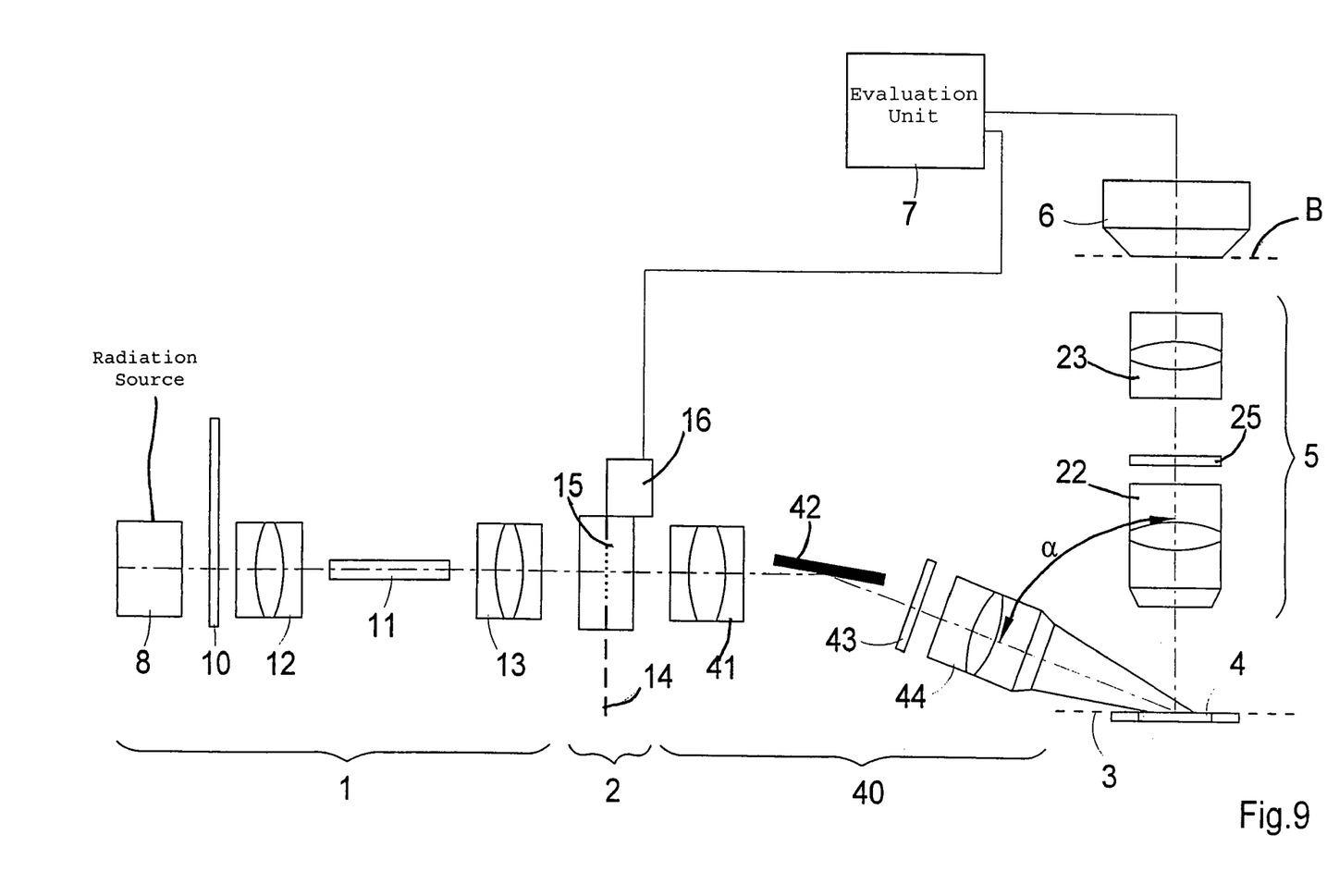

An arrangement according to a seventh preferred embodiment of the invention is shown in FIG. 9 wherein the optical total configuration is schematically simplified. This arrangement distinguishes from the arrangement of the first embodiment in that the element, which acts as a diaphragm, can be imaged sharply on the object for dark field illumination. For this purpose, the second illumination optic 19 is replaced by a modified second illumination optic 40 and the beam splitter 21 is no longer needed. For components, which are unchanged from the first embodiment, the same descriptions of the first embodiment apply and the same reference numerals are used.

The arrangement includes the illumination unit 1 having a light or radiation source 8 downstream of which the following are arranged: the shutter 10 (optional) and, advantageously, optical elements 11, which homogenize the beam path (such as a light conducting rod or an internally mirrored glass hollow rod), and illumination optics 12 and 13 for the homogeneous illumination of a unit 2 for generating illumination patterns. The unit 2 is arranged in the field diaphragm plane 14 in the beam path and has, in the embodiment, the structured field diaphragm 15. This field diaphragm 15 is arranged in the beam path so as to be positionable in two mutually orthogonal directions of the field diaphragm plane 14. The field diaphragm 15 can therefore be displaced in this plane 14 by means of the drive 16 coupled to the field diaphragm 15.

The modified second illumination optic 40 is mounted downstream of the field diaphragm 15 and includes, in the embodiment, an illuminating tube 41, a deflecting mirror 42, an excitation filter 43 and an objective 44. With the illuminating optic 40, the element, which acts as a structured diaphragm and is here the structured field diaphragm 15, is imaged in the dark field illumination onto the object plane 3 or the object 4 which is to be measured or to be investigated. The second illumination optic 40 defines a so-called Scheimpflug optic whose optical axis is at an angle α to the optical axis of the imaging optic 5. The optical axis of the imaging optic 5 runs perpendicular to the surface of the object 4 or to the surface of the object plane 3. Advantageously, the angle α is >50°. The imaging optic 5 includes, for example, the objective 22, the filter 25 and the imaging tube 23. With this imaging optic 5, the object 4 is imaged rich in contrast together with the illumination structure, which is superposed on the object, onto the position resolving detector 6 for optical radiation.

In the same manner, the imaging optic can be configured as a Scheimpflug optic in a modified embodiment. In this case, the optical axis of the second illumination optic 40 is perpendicular to the surface of the object 4 or to the object plane 3. With this optical axis, the optical axis of the imaging optic defines the angle α.

It is understood that the foregoing description is that of the preferred embodiments of the invention and that various changes and modifications may be made thereto without departing from the spirit and scope of the invention as defined in the appended claims.

What is claimed is:

1. A method for imaging an object onto a position-resolving detector utilizing a wide-field optic while suppressing stray light, said method comprising the steps of:
   illuminating said object in at least one plane of said object with at least two illumination patterns;
   detecting images corresponding to each one of said illumination patterns with each one of said illumination patterns having bright regions and dark regions with said dark regions completely covering said object when said illumination patterns are superposed;
   determining a dark image of said object from the detected images;
   generating a bright image of said object; and,
   subtracting said dark image from said bright image.

2. The method of claim 1, wherein, for determining the dark image, regions of the detected images are joined together with said regions being images of said dark regions of said object during illumination with said illumination patterns.

3. The method of claim 1, wherein said dark image is smoothed via computer.

4. The method of claim 1, wherein said bright image is generated by detecting an image when there is unstructured illumination.

5. The method of claim 1, wherein said bright image is generated from images detected during illumination with said illumination patterns; and, said illumination patterns having bright regions which completely cover said object in said object plane when said illumination patterns are superposed.

6. The method of claim 5, wherein, for generating the bright image, regions of the detected images are joined together with the regions being images of the bright regions of said object during illumination with said illumination patterns.

7. The method of claim 6, wherein said bright image is joined together from partial regions of the detected images which partial regions are images of the bright regions of said object during illumination with said illumination patterns and which border on each other without overlapping.

8. The method of claim 5, wherein said bright image is generated by additive superposition of all images which were detected during illumination of said object with said illumination patterns.

9. The method of claim 1, wherein said illumination patterns are given by a basic pattern which is shifted differently in each case relative to said object.

10. The method of claim 9, wherein said object is shifted relative to the illumination pattern.

11. The method of claim 9, wherein said basic pattern is shifted by a mechanical device.

12. The method of claim 9, wherein an electrically driveable modulation unit for light is so driven that said illumination patterns are generated.

13. The method of claim 1, wherein said illumination patterns are periodically alternating stripe-shaped bright and dark regions which are shifted transversely to the direction of said stripes.

14. The method of claim 13, wherein the image, which comes from subtraction of the dark image from the bright image, is filtered at low frequency.

15. The method of claim 1, wherein illumination patterns are used each having a periodic arrangement of bright regions and dark regions in two directions; and, the arrangements are offset with respect to each other in at least one of the directions.

16. The method of claim 15, wherein the image, which arises from subtraction of the dark image from the bright image, is filtered at low frequency.

17. An arrangement for detecting an image of an object wherein stray light influences are suppressed, said object defining an object plane and said arrangement comprising:
an illumination unit transmitting light along a beam path for illuminating said object in said object plane thereby causing optical radiation to emanate from said object;
a generating unit for generating at least two pregiven illumination patterns for illuminating said object in said object plane;
said generating unit including an element functioning as a structured diaphragm and said element being arranged in said beam path downstream of said illumination unit;
said illumination patterns each having bright regions and dark regions in said object plane with said dark regions completely covering said object when said illumination patterns are superposed in said object plane;
an imaging optic defining an image plane and being configured so as to image said object plane onto said image plane;
a position-resolving detector arranged in said image plane for detecting the optical radiation emanating from said object and for outputting detector signals; and,
an evaluation unit for evaluating said detector signals in order to determine a dark image from images detected during radiation with respective ones of said illumination patterns and in order to subtract said dark image from a bright image of said object.

18. The arrangement of claim 17, wherein said generating unit is provided to generate illumination patterns with bright regions which completely cover said object when said illumination patterns are superposed in said object plane; and, said bright image is generated by said evaluation unit from images detected during illumination with said illumination patterns.

19. The arrangement of claim 18, wherein said element is a field diaphragm having a stripe-shaped structure of alternating transparent and opaque regions.

20. The arrangement of claim 18, wherein said element is a field diaphragm having an arrangement of transparent and opaque regions in two directions with said opaque regions bordering one on the other.

21. The arrangement of claim 18, wherein said element is an electronically driveable modulation unit.

22. The arrangement of claim 21, wherein said modulation unit is an LCD.

23. The arrangement of claim 21, wherein said modulation unit is a DMD.

24. The arrangement of claim 17, wherein said generating unit further includes a drive for moving said object or a carrier of said object; said evaluation unit is operatively connected to said drive for controlling said object or said carrier so as to cause a basic pattern to image an illumination pattern on said object moved by said carrier; and, said evaluation unit functions to automatically detect images of said detector after each change of position of said object.

25. The arrangement of claim 24, wherein said element is a field diaphragm and said generating unit further includes a moveable light-deflecting element mounted downstream of said field diaphragm for generating at least two illumination structures.

26. The arrangement of claim 17, wherein said element is a field diaphragm and said generating unit further includes a drive for moving at least a part of said field diaphragm; said evaluation unit is operatively connected to said field diaphragm for controlling said field diaphragm so as to cause said illumination patterns to be radiated onto said object; and, said evaluation unit functions to automatically detect images of said detector after each change of said illumination patterns.

27. The arrangement of claim 17, said arrangement further comprising an illuminating optic for imaging said element onto said object; and, said illuminating optic being configured as an illuminating optic for a dark-field illumination.

28. The arrangement of claim 27, wherein said illuminating optic is a Scheimpflug optic.

29. The arrangement of claim 27, wherein said imaging optic defines a first optical axis; said illuminating optic defines a second optical axis and is configured to have a small aperture; and, said first and second optical axes conjointly define an angle $\alpha$.

30. The arrangement of claim 29, wherein said illuminating optic is a Scheimpflug optic.

31. The arrangement of claim 17, wherein said imaging optic is a Scheimpflug optic.

* * * * *

UNITED STATES PATENT AND TRADEMARK OFFICE
CERTIFICATE OF CORRECTION

PATENT NO. : 7,567,726 B2  Page 1 of 1
APPLICATION NO. : 11/266236
DATED : July 28, 2009
INVENTOR(S) : Peter Westphal It is certified that error appears in the above-identified patent and that said Letters Patent is hereby corrected as shown below:

In column 5:
Line 24: delete "resealing" and substitute -- rescaling -- therefor.

In column 6:
Line 14: delete "resealing" and substitute -- rescaling -- therefor.

In column 9:
Line 7: delete "500" and substitute -- 50° -- therefor.

In column 12:
Line 8: delete "resealing" and substitute -- rescaling -- therefor.
Line 19: delete "resealing" and substitute -- rescaling -- therefor.

Signed and Sealed this

Third Day of November, 2009

David J. Kappos
*Director of the United States Patent and Trademark Office*